(12) United States Patent
Zengerle et al.

(10) Patent No.: US 8,047,567 B2
(45) Date of Patent: Nov. 1, 2011

(54) GAS GENERATOR

(75) Inventors: Werner Zengerle, Regensburg (DE); Simon Schreiber, Wasserburg am Inn (DE); Karsten Schwuchow, Wasserburg am Inn (DE); Josef Leitl, Mettenheim (DE); Juergen Klimas, Waldkraiburg (DE)

(73) Assignee: TRW Airbag Systems GmbH, Aschau Am Inn (DE)

( * ) Notice: Subject to any disclaimer, the term of this patent is extended or adjusted under 35 U.S.C. 154(b) by 274 days.

(21) Appl. No.: 12/221,810

(22) Filed: Aug. 7, 2008

(65) Prior Publication Data

US 2009/0039628 A1 Feb. 12, 2009

(30) Foreign Application Priority Data

Aug. 8, 2007 (DE) .......................... 10 2007 037 325

(51) Int. Cl.
*B60R 21/264* (2006.01)
*B60R 21/26* (2006.01)

(52) U.S. Cl. ........................ 280/736; 280/741

(58) Field of Classification Search .................. 280/736, 280/741, 742; 102/530, 531; 222/3
See application file for complete search history.

(56) References Cited

U.S. PATENT DOCUMENTS

| | | | |
|---|---|---|---|
| 4,249,673 A | 2/1981 | Katoh et al. | |
| 4,817,828 A | 4/1989 | Goetz | |
| 4,950,458 A | 8/1990 | Cunningham | |
| 5,060,973 A | 10/1991 | Giovanetti | |
| 5,625,164 A * | 4/1997 | McFarland et al. | 102/531 |
| 5,636,865 A * | 6/1997 | Riley et al. | 280/741 |
| 5,876,062 A * | 3/1999 | Hock | 280/736 |
| 5,882,036 A | 3/1999 | Moore et al. | |
| 5,970,880 A * | 10/1999 | Perotto | 102/531 |
| 7,540,241 B2 * | 6/2009 | Bierwirth | 102/530 |

FOREIGN PATENT DOCUMENTS

| | | |
|---|---|---|
| DE | 2908075 | 10/1979 |
| DE | 3733436 | 4/1988 |
| DE | 19528864 | 2/1997 |
| DE | 19725452 | 12/1998 |
| EP | 0997356 | 5/2000 |

* cited by examiner

*Primary Examiner* — Eric Culbreth
*Assistant Examiner* — George D. Spisich
(74) *Attorney, Agent, or Firm* — Tarolli, Sundheim, Covell & Tummino LLP

(57) ABSTRACT

A gas generator, particularly for a vehicle occupant restraint system, has at least one igniter (12), a pyrotechnic solid propellant bed (22), a combustion chamber (20) containing the propellant bed (22) and at least one wall part (24), the wall part (24) being arranged in the combustion chamber (20), which is moved by a gas stream generated on activation of the gas generator into the region of the propellant bed (22) which is not yet ignited, and in its interior (25) defines a gas-directing channel reaching into the propellant bed (22).

18 Claims, 5 Drawing Sheets

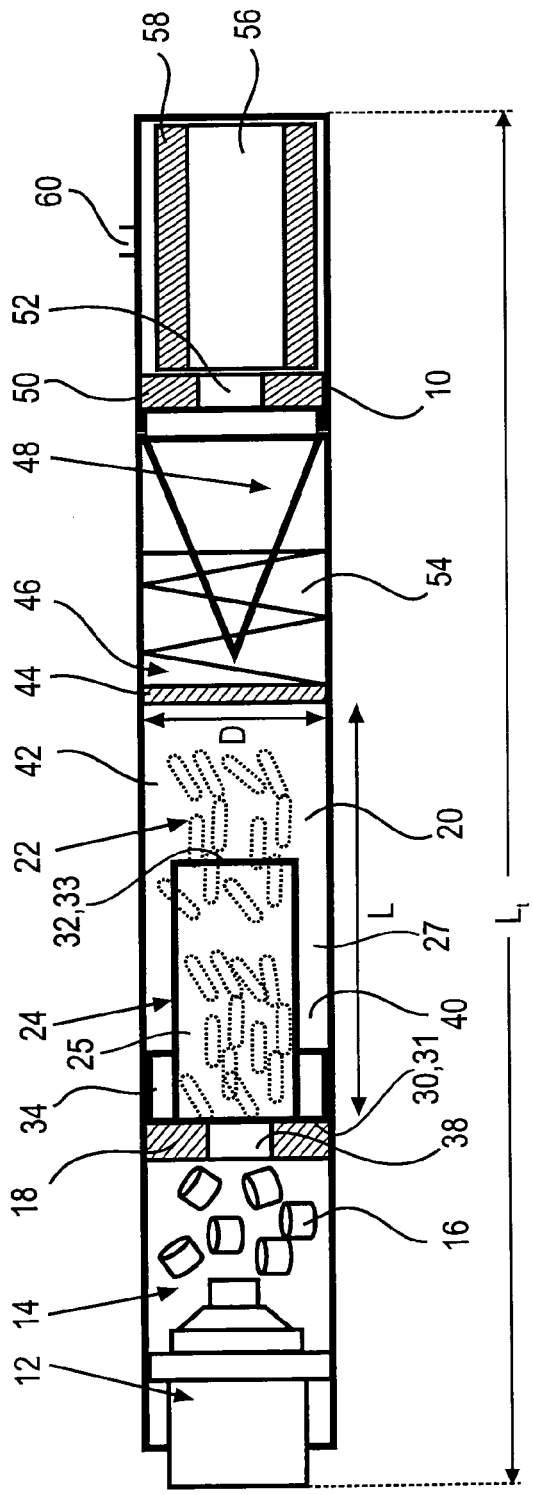

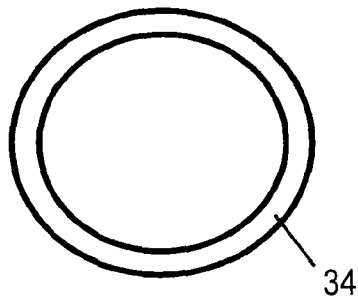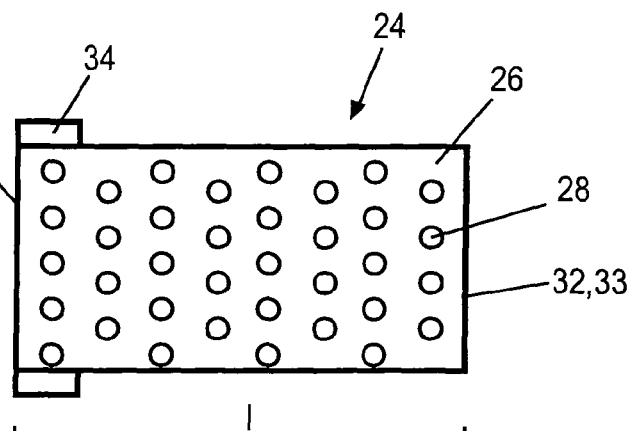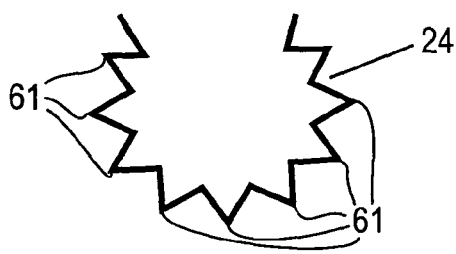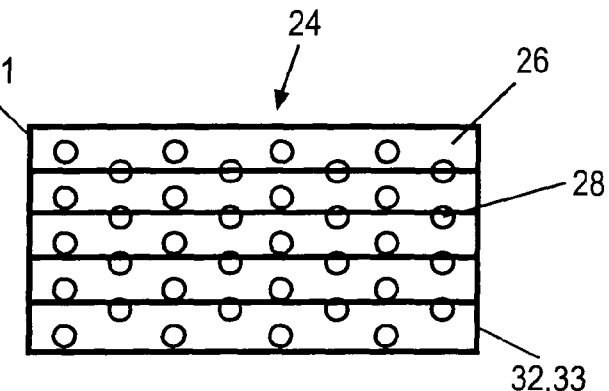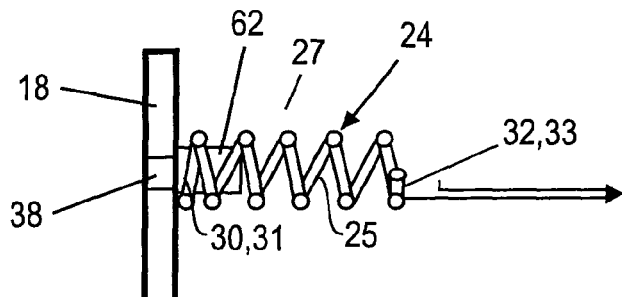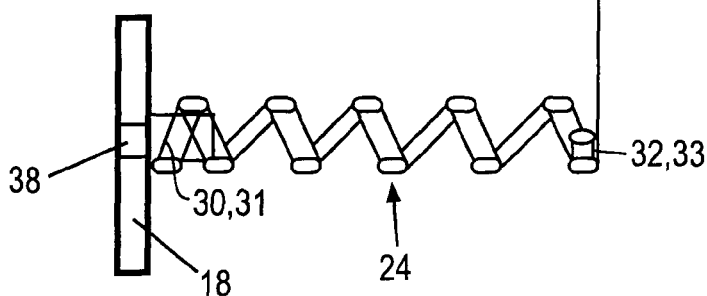

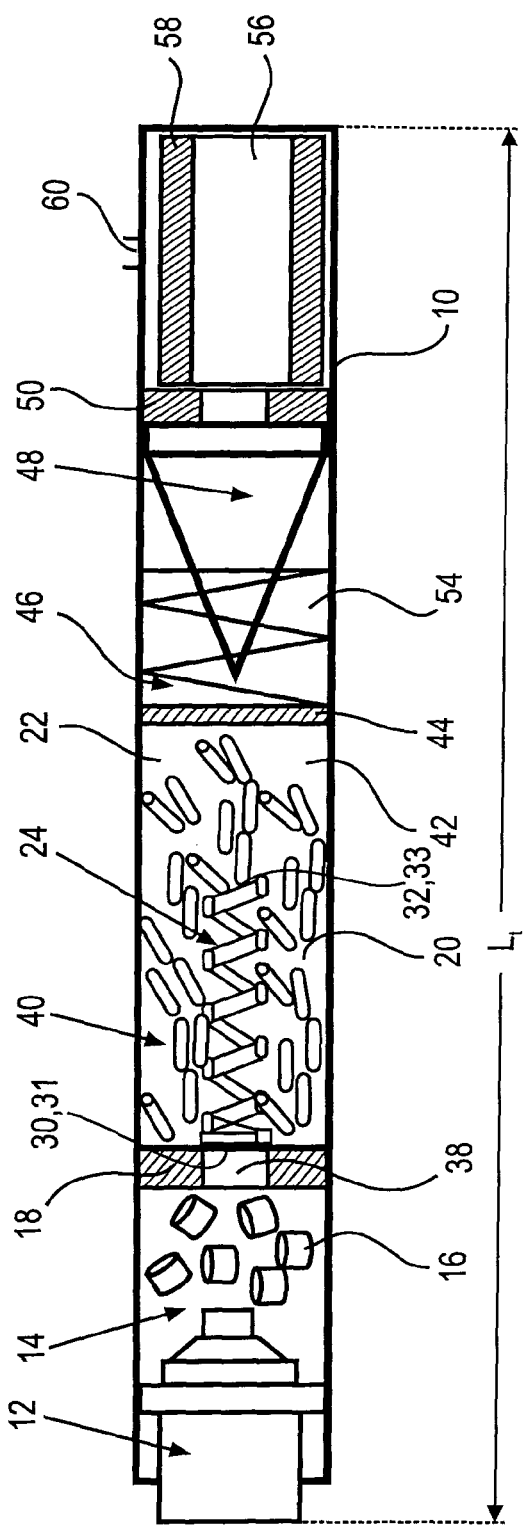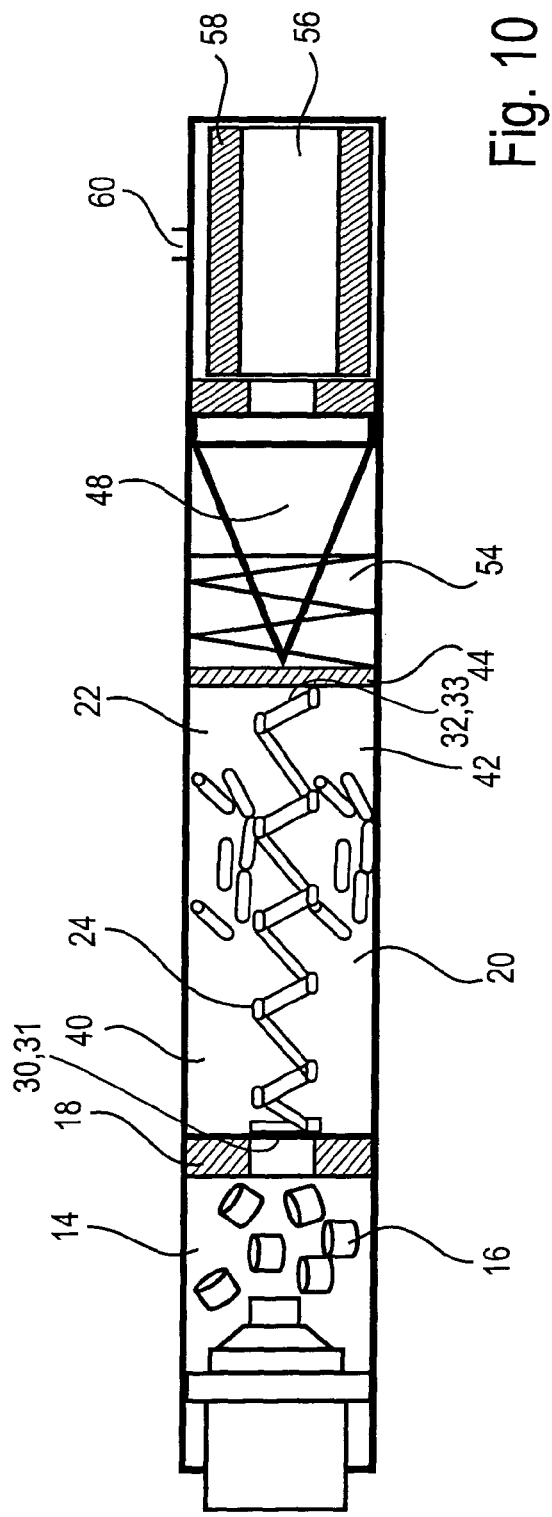

GAS GENERATOR

TECHNICAL FIELD

The invention relates to a gas generator, particularly for a vehicle occupant restraint system, with at least one igniter and a combustion chamber containing a pyrotechnic solid propellant bed.

BACKGROUND OF THE INVENTION

Gas generators of this type are either solid propellant generators or so-called hybrid generators having a combustion chamber with solid propellant and with compressed gas. When it is activated electrically, the igniter generates hot gas and particles which ignite the pyrotechnic charge in the combustion chamber. Usually, the pyrotechnic solid propellant bed consists of a loose, i.e. random fill of small solid propellant tablets. The propellant bed is ignited from one side, and the resulting gas then flows through the part of the solid propellant which is not yet ignited, which more or less impedes the outflow of the resulting gas. A holding back of the gas can occur particularly in combustion chambers which are elongated and are ignited from one end side, i.e. combustion chambers with a small cross-section in relation to their length. This is spoken of here in terms of a so-called "jamming", in which the generated gas can not be carried off quickly enough. Furthermore, after-burning phenomena can occur. The gas accumulation can also lead to the compacting of the tablets and to a fracture of individual tablets, so that during the igniting, a compacting takes place of the propellant which is not yet ignited, which further intensifies the above effects. Therefore, a slower burning of the propellant is caused, owing to the smaller surface, so that the rise in pressure of the outflowing gas can be negatively influenced. The reproducibility of the pressure curve, with respect to the gas flowing out from the gas generator, is made difficult.

EP 0 997 356 B1 or U.S. Pat. No. 5,882,036 therefore propose additionally incorporating a filter-like spacer between the inner side of the combustion chamber wall and the propellant bed, which spacer is spaced radially from the inner side of the combustion chamber wall and provides for outflow channels. The gas which is being produced can flow quickly via these channels to other regions of the propellant charge and ignite them, or the gas can also flow out quickly without hindrance through the remaining propellant via the channels.

The expenditure for such a construction is to be reduced by the invention, because the cylindrical filter elements must be relatively stable in construction, so as not to be pressed radially outwards against the inner side of the combustion chamber wall and so as not to constrict or close the channels in the case of the pressure which is produced.

BRIEF SUMMARY OF THE INVENTION

This is achieved in a gas generator, particularly for a vehicle occupant restraint system, with at least one igniter, a pyrotechnic solid propellant bed, a combustion chamber containing the propellant bed and at least one wall part, the wall part being arranged in the combustion chamber, which is moved by a gas stream generated on activation of the gas generator into the region of the propellant bed which is not yet ignited, and in its interior defines a gas-directing channel reaching into the propellant bed.

The wall part in the invention is arranged so as to be movable, in contrast to the filters in the prior art, and penetrates "deeper" into the propellant bed. By the movement in the direction of flow, the wall part offers a small resistance to the gas flow, so that the stressing of the wall part is less than that of the filters in the prior art. In order to avoid the above-mentioned jamming, and to ensure a rapid ignition of the gas, the wall part moves into the propellant bed and makes it possible to ignite the propellant from a different side than via the flame front which is moving across uniformly. The gas-directing channel can be formed, for example, inside the space formed by the wall part or between the inner side of the combustion chamber wall and the outer side of the wall part. Outflow parameters of the gas generator can also be set very simply and quickly by means of the size of the wall part.

So that the wall part offers a slight resistance to the flow, it is to have openings which expose at least 50% of the envelope of the combustion chamber. In the case of a cylindrical wall, the envelope would be for example the peripheral surface and the two end sides. 50% of this surface would consist at least of through-flow openings or free sides.

The wall part can of course also serve as a filter or pre-filter. Also, moreover, the burning can be controlled by means of the geometric shape of the wall part.

The gas generator according to the invention has a combustion chamber, the length of which preferably corresponds to at least three times the greatest cross-section.

The initial length of the wall part existing in the non-activated state of the gas generator (measured in the direction of movement) is to preferably be a maximum of 80% of the length of the propellant bed, in order to still have a sufficient movement distance available.

According to a preferred embodiment, provision is made that the wall part is hollow and at least during movement is partially open radially in order to allow hot gas to flow between a radially inner and a radially outer section of the combustion chamber. This hot gas then serves for the ignition of the section of the solid propellant which is not yet activated. This part which is not yet activated can be the radially outer or the radially inner section.

The wall part is constructed for example so that it moves as a whole in the combustion chamber.

As an alternative or in addition to this, the wall part can be constructed so as to be elastic and can extend in the propellant bed. It would be possible here to connect the wall part at one end securely with the combustion chamber wall or to another stationary part of the gas generator. The wall part would then be extended by the flow, in order to drive the gas-directing channel into the propellant bed.

An example of such an elastic wall part is a spring, particularly a helical spring, which is movable at one axial end and extends axially on ignition. The helical spring can be cylindrical in construction or can be tapered.

When the wall part has an open inflow end which, in particular, is an axial end, the gas arrives without flow resistance immediately into the interior of the wall part, in order to then move the latter, with the movement however, as previously explained, also being able to be expansion.

At the outflow end, which is opposed to the inflow end, the wall part can likewise be formed so as to be open or closed. With the outflow end ahead, the wall part then moves further into the propellant bed.

The combustion chamber preferably has a so-called igniter side, and when the gas generator is activated the wall part is moved from a position which is closer to the igniter side into a position which is further away from the igniter side. Another embodiment would make provision that through gas deflection the gas for moving the wall part does not strike onto the wall part from the igniter side.

The arrangement of the igniter, the geometry of the inner walls and the arrangement of the outflow openings produces a main flow direction in the combustion chamber. According to a preferred embodiment, the wall part is to be moved in this main flow direction, in order to avoid a gas deflection.

In particular, a mounting is provided so that the movement of the wall part takes place in a reproducible manner as possible.

This mounting can be a guide, particularly a linear guide. Alternatively, a one-sided fastening of the wall part is also possible. The wall part would then be permanently fastened on this one-sided fastening end. This solution is advantageous particularly for the above-mentioned elastic embodiment of the wall part.

One embodiment of the wall part makes provision that it is to be constructed as a hollow, cylindrical body via one end side of which generated gas flows in.

The wall part can rest at least on a part of its outer side against the combustion chamber wall. The combustion chamber wall then forms a mounting and a guide for the wall part.

Propellant can already be present inside the wall part in the non-activated state of the gas generator, i.e. an exposed gas-directing channel does not yet have to be formed inside the wall part. This makes the gas generator according to the invention more compact, because the combustion chamber does not undergo any additional enlargement by the wall part.

In the non-activated state of the gas generator, the wall part is to be adjacent to a dividing wall to the igniter, in order to have a defined initial state and in order to ensure that the wall part is moved as quickly as possible from the gas already generated by the igniter.

The dividing wall can have at least one through-flow opening which opens into the interior of the wall part.

DESCRIPTION OF THE DRAWINGS

FIG. 1 shows a longitudinal sectional view through a gas generator according to the invention in accordance with a first embodiment in the non-activated state, FIG. 2 shows a longitudinal sectional view through the gas generator according to FIG. 1 in the activated state, FIG. 3 shows a front view of the wall part in the gas generator according to FIG. 1, FIG. 4 shows a side view of the wall part according to FIG. 3, FIG. 7 shows a front view of the wall part in the gas generator according to FIG. 5, FIG. 8 shows a side view of the wall part according to FIG. 7, FIG. 9 shows a longitudinal sectional view through a gas generator according to the invention in accordance with a third embodiment in the non-activated state, FIG. 10 shows a longitudinal sectional view through the gas generator according to FIG. 9 in the activated state, FIG. 11 shows a detail view of the wall part of the gas generator according to FIG. 6 in the non-activated state, FIG. 12 shows a detail view of the wall part according to FIG. 11 in the activated state.

BRIEF DESCRIPTION OF THE PREFERRED EMBODIMENTS

Figure 5:
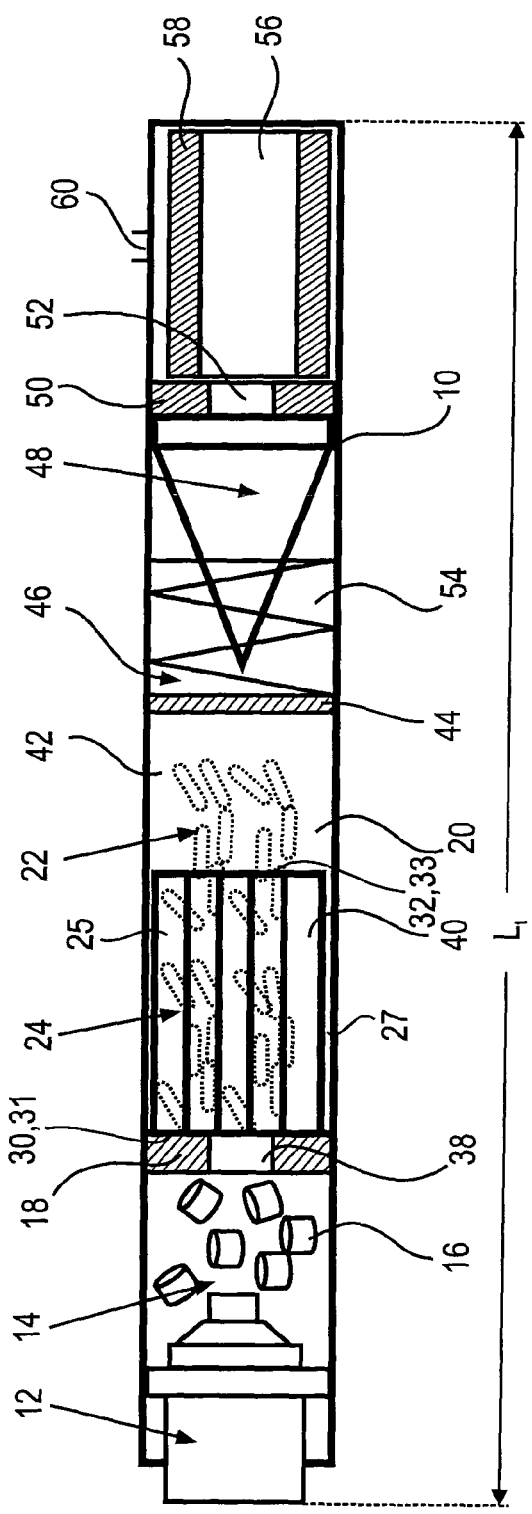
FIG. 5 shows a longitudinal sectional view through a gas generator according to the invention in accordance with a second embodiment in the non-activated state.
Figure 6:
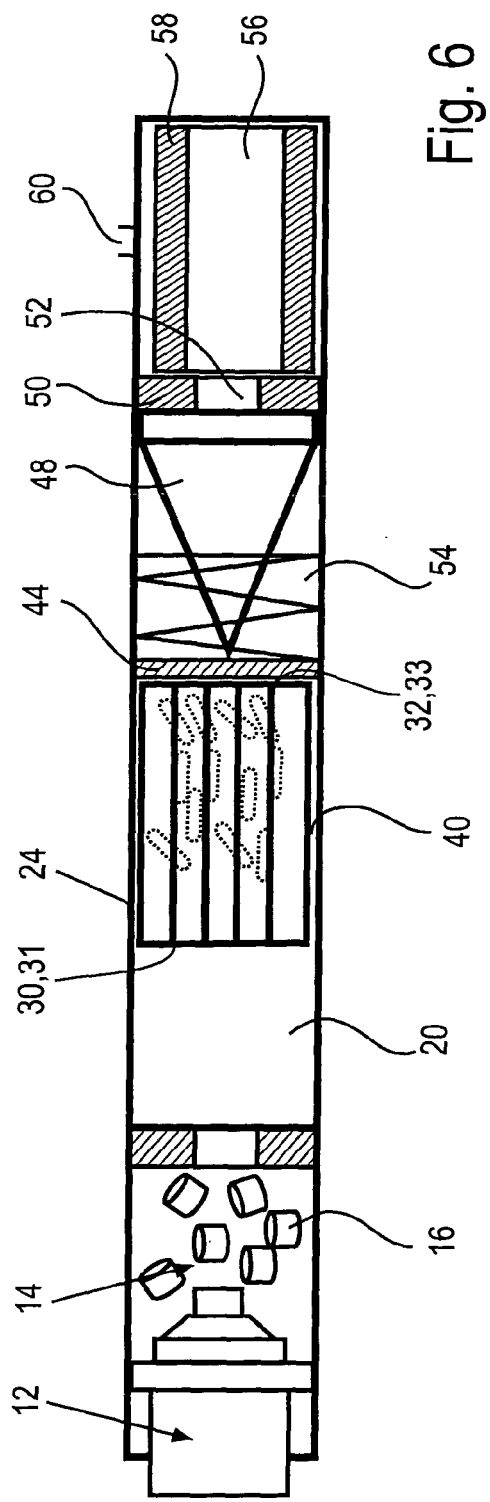
FIG. 6 shows a longitudinal sectional view through the gas generator according to FIG. 5 in the activated state.

In FIG. 1 a gas generator is shown in the form of an elongated tubular gas generator. The outer housing 10 has a total length $L_t$ which has more than four times, in particular more than eight times the diameter. An igniter 12 is arranged at the left-hand end in FIG. 1. The igniter 12 is a prefabricated unit which is closed in itself. An igniter chamber 14, which is filled with solid propellant 16, is adjacent to the igniter 12. The igniter chamber 14 is separated from an adjacent, elongated combustion chamber 20 by a disc-like dividing wall 18. The combustion chamber 20 has a total length L which is at least three times as great as the greatest extent in cross-section. As in the example embodiment the combustion chamber 20 has a cylindrical outer periphery, the diameter D is the measure of comparison.

The combustion chamber 20 is filled with a pyrotechnic solid propellant bed 22. The propellant bed 22 consists of a fill of individual propellant tablets.

A wall part 24 is arranged so as to be movable in the axial direction in the combustion chamber 20.

The hollow wall part 24 can be seen in further detail in FIGS. 3 and 4. In this embodiment, it has a substantially cylindrical, ring-shaped peripheral wall 26 with numerous openings 28. The two end sides 30, 32 on the inflow end 31 and respectively outflow end 33 are completely open. An axially projecting collar 34, which is easy to produce by shaping the tube end, is formed on the peripheral wall 26 in the region of the inflow end 31. The wall part 24 therefore lies with this collar 34 with a part of its outer periphery against the inner side of the outer housing 10 so as to be slidably displaceable. The remainder of the peripheral wall 26 lies spaced apart slightly from the inner side of the outer housing 10.

The length l of the wall part 24 corresponds to a maximum 80% of the length L of the combustion chamber 20.

In the non-activated position of the gas generator shown in FIG. 1, the wall part 24 lies with its left-hand end side 30 against the dividing wall 18. The dividing wall 18 has a through-flow opening 38 which opens into the interior of the wall part 24, the interior of the wall part 24 being referenced with 25 and the exterior with 27. The interior 25 of the wall part 24 is defined by the peripheral wall 26.

The propellant bed 22 in the combustion chamber 20 not only fills the hollow interior 25 of the wall part 24, but also the section 42 of the combustion chamber 20 between the end wall 32 and a displaceable, gas-permeable wall 44 is filled with propellant. However, no solid propellant is housed in the annular chamber 40; the annular chamber 40 is too narrow for this.

The wall 44 is a perforated disc, for example. Adjacent to it is a so-called filling body 46, which presses the wall 44 against the propellant bed 22 and pre-stresses the latter. The filling body 46 is a spring, for example. The spring surrounds a tapered screen 48 which is adjacent to a wall 50 provided with a central opening 52. The wall 50 separates the space 54, provided with the filling body 46 and the screen 48, from a filter chamber 56. A cylindrical filter 58 is provided in the filter chamber 56.

The outer housing 10 has several outflow openings 60 distributed on the periphery in the region of the filter chamber 56.

The mode of operation of the gas generator is now described with the aid of FIGS. 1 and 2.

On activation of the igniter 12, the charge 16 is ignited in the igniter chamber 14 and the hot gas and any particles flow via the through-flow opening 38 into the interior 25 of the wall part 24, i.e. into this radially inner section of the combustion chamber. The propellant bed 22 inside the wall part 24 is ignited. The resulting hot gas together with the hot gas from the igniter chamber 14 move the wall part 24 in the main flow direction axially in the direction of the wall 44. Although the two end sides 30, 32 (i.e. the inflow and the outflow end 31, 33) are open, a thrust is generated by the gas- and pressure surge. On the one hand, the flow is not exactly axially aligned, but rather is turbulent, so that a flow component running obliquely toward the right is also present, impinging obliquely onto the wall of the openings 28 in the peripheral wall 28 and hereby initiating an impulse onto the wall part 24. On the other hand, some propellant bodies of the propellant bed 22 also become caught in the openings 28, which provides for an effective area for the pressure impulse. The gas also flows radially outwards through the openings 28 and via the annular chamber 40 into the solid propellant between the end wall 32 and the wall 44. Gas also flows of course via the end side 32 into the region of propellant which is not yet burnt.

The wall part 24 moves towards the right inside the propellant bed 22. In so far as this was able to be ascertained by X-ray photographs, the wall part 24, in so doing, displacing the propellant bodies of the propellant bed 22 inwards and outwards. Only a portion of the propellant lying in the direction of movement in front of its wall part 24 is ignited before the wall part 24 reaches this section of the propellant bed 22. The wall part 24 travels, as it were, together with the pressure wave and clears its way through the solid propellant bed 22. The remaining propellant then ignites inside the wall part 24, i.e. the propellant which is not yet ignited, and then this gas flows radially outwards.

The wall part 24 finally abuts against the wall 44.

The displaceability of the wall 44 can assist the displacement of the propellant bodies of the propellant bed 22 through the movement of the wall part 24, so that it is advantageous, but not compulsorily necessary, that at least one wall which delimits the combustion chamber 20 is constructed so as to be flexible or displaceable.

The tests which have been made hitherto have shown that through the movable wall part 24 in elongated combustion chambers, the tendency to a fluid-mechanical "jamming" of the propellant bed 22 is reduced, by the through-flow resistance of the combustion gas through the propellant bed 22 being substantially reduced.

The movement of the wall part 24 in the combustion chamber 20 is guided through a mounting which in the present case is formed by the collar 34 and the inner side of the outer housing 20, which complement each other to form a linear guide. Moreover, the collar 34 can be constructed so as to be closed or open.

The embodiment according to FIGS. 5 to 8 corresponds substantially to the first embodiment previously mentioned, so that only the differences are entered into in detail below.

The difference here consists in the embodiment of the wall part 24, which according to the second embodiment is formed as a sheet metal body which is folded or deformed in a star shape or wave shape. FIGS. 7 and 8 show the wall part 24 star-shaped with outer points 61. In contrast to the wall part 24 according to FIGS. 3 and 4, the wall part 24 according to FIGS. 7 and 8, viewed in cross-section, is not encircling in a closed form, but rather partially open (see upper section in FIG. 7). Here, also, numerous openings 28 are provided on the peripheral wall 26, and here also the end sides 30, 32 are constructed so as to be fully open.

The wall part 24 lies with the outer points 61 or outer sections of the peripheral wall 26 against the inner side of the outer housing 10, so that here also a mounting and guide is formed for the wall part 24. The wall part 24 moves, as can be seen with the aid of FIGS. 5 and 6, after ignition, from the initial position, in which it lies against the wall 18, up to the wall 44.

The third embodiment according to FIGS. 9 to 12 has a differently constructed wall part 24, which in this embodiment is constructed so as to be extendable elastically. An example of such an extendibility is the embodiment as a spring, particularly a helical spring. The wall part 24 is fastened via a tube 62 to the wall 18, i.e. is fastened on one side. The tube 62 is especially shown in FIGS. 11 and 12. On igniting, the wall part 24 extends elastically in the axial direction (see FIG. 12) and presses deeper into the propellant bed 22. The right-hand end side 32 is not completely open in this embodiment. The spring forming the wall part 24 in fact has an end in this region which is angled radially inwards. In this embodiment, there is also no propellant of the propellant bed 22 contained inside the wall part 24 before ignition. The wall part 24 also does not press axially into the propellant bed 22 so that propellant penetrates axially into the interior 25 of the wall part 24. Rather, the wall part 24 extends and pushes through between individual propellant bodies towards the right in the direction of the wall 44, which it can also reach if applicable.

Figure 13:
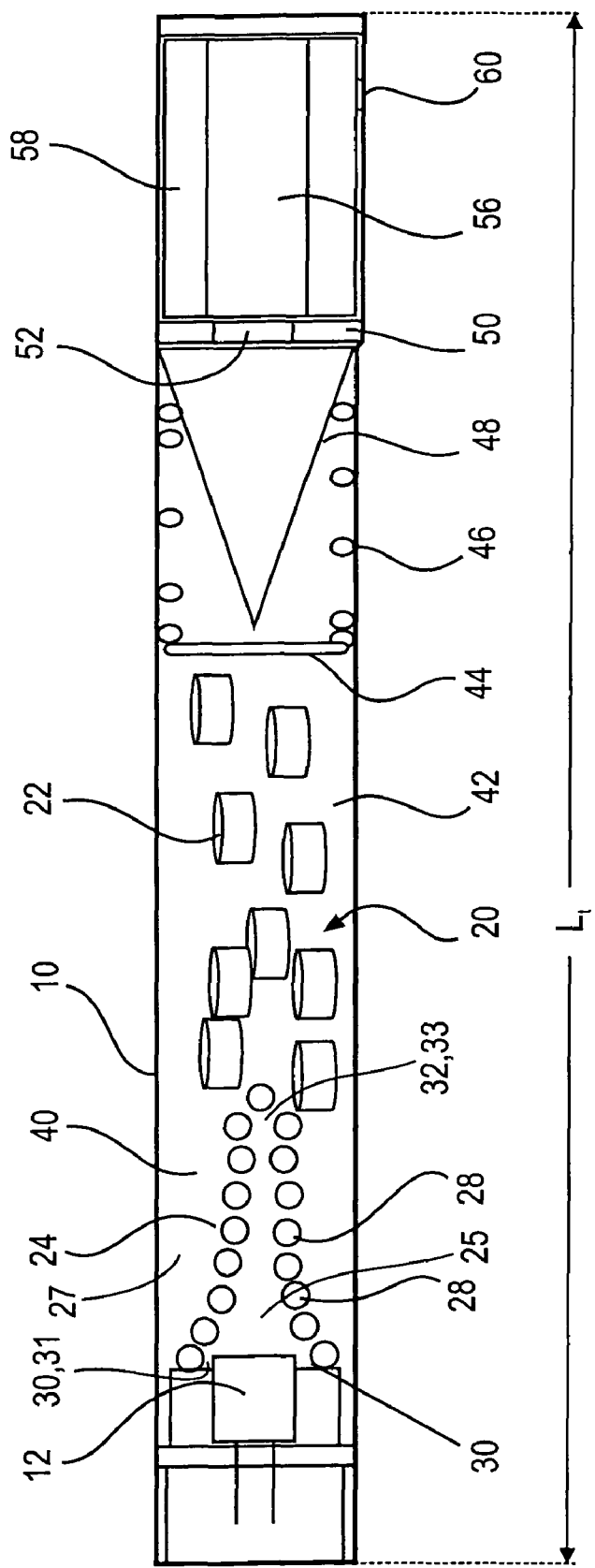
FIG. 13 shows a longitudinal sectional view through the gas generator according to a further embodiment.

In the embodiment according to FIG. 13, the igniter 12 is immediately adjacent to the combustion chamber 20; it even projects slightly into the cavity formed by the wall part 24. The igniter chamber 14 and the dividing wall 18 are dispensed here. The wall part 24 is formed by a spring, with no propellant being housed by the cavity circumscribed by the wall part 24. The wall part 24 is only extended by the hot gases of the igniter 12.

In all embodiments, a gas-directing channel is produced inside the wall part by the moving wall part 24, or the gas-directing channel becomes longer.

The invention claimed is:

1. A gas generator for a vehicle occupant restraint system, with at least one igniter (12),
    a pyrotechnic solid propellant bed (22),
    a combustion chamber (20) containing said propellant bed (22) and
    at least one wall part (24),
    said at least one wall part (24) being constructed so as to be elastic and defining a gas-directing channel in its interior (25), said channel reaching into said propellant bed (22), whereas said at least one wall part (24) extends into a first area of said propellant bed (22) in a non-activated condition, said first area of said propellant bed (22) being situated close to said igniter (12); and
    wherein the at least one wall part (24) is constructed so as to expand into a second area of said propellant bed (22) on activation of said gas generator, said second area of said propellant bed (22) being situated at the end of said combustion chamber (20) that is placed remotely from said igniter (12).

2. The gas generator according to claim 1 wherein said at least one wall part (24) is hollow, has an interior (25) and an exterior (27) and is at least partially open radially during a movement, in order to allow hot gas to flow between the interior (25) of the at least one wall part (24) and the exterior (27) of the at least one wall part (24).

3. The gas generator according to claim 1 wherein an additional wall part is constructed so that it moves as a whole in said combustion chamber (20).

4. The gas generator according to claim 1 wherein said at least one wall part (24) is a spring.

5. The gas generator according to claim 1 wherein said at least one wall part (24) has an open inflow end (31).

6. The gas generator according to claim 5 wherein said at least one wall part (24) has an open or closed outflow end (33) opposed to said inflow end (31), by which said at least one wall part (24) is moved ahead further into said solid propellant bed (22).

7. The gas generator according to claim 1 wherein said at least one wall part (24) divides the combustion chamber (20) on movement into a radially inner and a radially outer section.

8. The gas generator according to claim 1 wherein there is a main direction of flow in said combustion chamber (20) and said at least one wall part (24) is moved in this direction.

9. The gas generator according to claim 1 wherein a mounting is provided for an additional wall part.

10. The gas generator according to claim 9 wherein said mounting is a linear guide.

11. The gas generator according to claim 9 wherein said mounting is a fastening of said additional wall part on one side.

12. The gas generator according to claim 1 wherein an additional wall part is a cylindrical hollow body, with generated gas flowing into an inflow end.

13. The gas generator according to claim 1 wherein in the non-activated state of said gas generator, propellant of said propellant bed (22) is situated inside an additional wall part.

14. The gas generator according to claim 1 wherein a dividing wall (18) is provided and, in the non-activated state of said gas generator, said at least one wall part (24) being adjacent to said dividing wall (18).

15. The gas generator according to claim 14 wherein said dividing wall (18) has at least one through-flow opening (38) which opens into said interior (25) of said at least one wall part (24).

16. The gas generator according to claim 1 wherein said igniter (12) is adjacent to said dividing wall (18) and said dividing wall (18) is adjacent to said hollow interior (25) of said at least one wall part (24).

17. The gas generator according to claim 1 wherein said at least one wall part (24) is a helical spring.

18. A gas generator, for a vehicle occupant restraint system, with at least one igniter (12),
    a pyrotechnic solid propellant bed (22),
    a combustion chamber (20) containing said propellant bed (22) and
    at least one wall part (24),
    said at least one wall part (24) being constructed so as to be elastic and arranged in said combustion chamber (20), which is moved by a gas stream generated on activation of said gas generator into a region of said propellant bed (22) which is not yet ignited, and which defines a gas-directing channel in its interior (25), said channel reaching into said propellant bed (22),
    wherein the elastic at least one wall part (24) is constructed so as to having an initial length, in a non-activated state of the gas generator, of a maximum of 80% of the length of the propellant bed (22) and the length of said elastic at least one wall part (24) extends, in an activated state of the gas generator, beyond said initial length to a maximum length up to a gas-permeable wall (44) which constitutes an end wall of said combustion chamber (20) more remote of said igniter (12).

* * * * *